(12) United States Patent
Leung

(10) Patent No.: US 12,506,587 B2
(45) Date of Patent: Dec. 23, 2025

(54) CARRIER AGGREGATION FRONT-END ARCHITECTURE

(71) Applicant: SKYWORKS SOLUTIONS, INC., Irvine, CA (US)

(72) Inventor: John Chi-Shuen Leung, Foothill Ranch, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 387 days.

(21) Appl. No.: 18/110,407

(22) Filed: Feb. 16, 2023

(65) Prior Publication Data

US 2023/0269060 A1  Aug. 24, 2023

Related U.S. Application Data

(60) Provisional application No. 63/311,696, filed on Feb. 18, 2022.

(51) Int. Cl.
*H04L 5/14* (2006.01)
*H04L 5/10* (2006.01)

(52) U.S. Cl.
CPC . *H04L 5/14* (2013.01); *H04L 5/10* (2013.01)

(58) Field of Classification Search
CPC ... H04L 5/14; H04L 5/10; H04L 5/001; H04L 5/1469; H04B 1/0067; H04B 3/00; H04B 13/00; H04B 1/50; H04B 1/54; H03H 9/58
See application file for complete search history.

(56) References Cited

U.S. PATENT DOCUMENTS

| | | | |
|---|---|---|---|
| 9,780,817 B2 | 10/2017 | Scott et al. | |
| 10,075,199 B2 | 9/2018 | King et al. | |
| 10,135,422 B2 * | 11/2018 | Goto | H03H 9/64 |
| 10,135,469 B2 | 11/2018 | Chang et al. | |
| 10,574,211 B2 * | 2/2020 | Saji | H03H 9/14541 |
| 10,784,903 B2 | 9/2020 | Wloczysiak et al. | |
| 10,938,469 B2 | 3/2021 | Zhan et al. | |
| 11,005,451 B2 * | 5/2021 | Bauder | H03H 9/584 |
| 11,064,491 B2 | 7/2021 | Balteanu | |
| 11,075,616 B2 * | 7/2021 | Ando | H03H 9/0014 |
| 11,405,013 B2 * | 8/2022 | Shin | H03H 9/605 |
| 11,621,690 B2 * | 4/2023 | Fukuhara | H03H 9/02834 29/25.35 |
| 2012/0171968 A1 | 7/2012 | Poulin et al. | |
| 2016/0323080 A1 * | 11/2016 | Khlat | H04B 1/38 |

(Continued)

OTHER PUBLICATIONS

International Search Report and Written Opinion from corresponding International Application No. PCT/US2023/013179 dated Jun. 8, 2023.

*Primary Examiner* — Bailor C Hsu
(74) *Attorney, Agent, or Firm* — Lando & Anastasi, LLP

(57) ABSTRACT

A carrier aggregation circuit that includes a primary signal path for processing a first frequency band, the first frequency band being a TDD frequency band, and a secondary signal path for processing a second frequency band. The primary signal path includes a first TDD filter configured to process receive signals in the first frequency band and a second TDD filter configured to process transmit signals in the first frequency band, the first TDD filter and the second TDD filter including one or more corresponding initial stages that are identical. Related front-end architectures, front-end modules, and wireless devices for carrier aggregation are also provided.

19 Claims, 7 Drawing Sheets

(56) References Cited

U.S. PATENT DOCUMENTS

| | | | |
|---|---|---|---|
| 2016/0365908 A1* | 12/2016 | Chang | H03F 3/245 |
| 2018/0019768 A1 | 1/2018 | King et al. | |
| 2018/0152945 A1* | 5/2018 | Balteanu | H04L 5/001 |
| 2020/0162053 A1* | 5/2020 | Goto | H03H 9/0542 |
| 2021/0351801 A1 | 11/2021 | Kani et al. | |
| 2021/0384925 A1 | 12/2021 | Nagamori | |
| 2023/0039184 A1* | 2/2023 | Maniwa | H05K 1/0233 |
| 2023/0269060 A1* | 8/2023 | Leung | H04L 5/14 |
| | | | 370/280 |

\* cited by examiner

CARRIER AGGREGATION FRONT-END ARCHITECTURE

CROSS-REFERENCE TO RELATED APPLICATIONS

This application claims priority under 35 U.S.C. § 119(e) to U.S. Provisional Patent Application Ser. No. 63/311,696, titled "CARRIER AGGREGATION FRONT-END ARCHITECTURE," filed Feb. 18, 2022, the entire contents of which is incorporated herein by reference for all purposes.

BACKGROUND

Field

Aspects of the present disclosure relate to carrier aggregation in radio-frequency applications.

Description of the Related Technology

Carrier aggregation (CA) is a data transmission strategy that transmits data across multiple frequency bands to increase data bandwidth, and thereby increase the bitrate. In some radio-frequency (RF) applications, cellular carrier aggregation can involve two or more RF signals being processed through a common path. For example, carrier aggregation can involve the use of a path for a plurality of bands having frequency ranges that are sufficiently separated. In such a configuration, simultaneous operation of more than one band can be achieved.

SUMMARY

According to one aspect of the present disclosure there is provided a carrier aggregation circuit comprising a primary signal path for processing a first frequency band, the first frequency band being a first time division duplex (TDD) frequency band, a secondary signal path for processing a second frequency band, the primary signal path including a first time division duplex filter configured to process receive signals in the first frequency band and a second time division duplex filter configured to process transmit signals in the first frequency band, and the first time division duplex filter and the second time division duplex filter including one or more corresponding initial stages that are identical.

In one example the first frequency band is a primary component carrier (PCC) and the second frequency band is a secondary component carrier (SCC).

In one example the first time division duplex filter includes one or more further stages coupled to the one or more initial stages and optimized for processing receive signals in the first frequency band.

In one example the second time division duplex filter includes one or more further stages coupled to the one or more initial stages and optimized for processing transmit signals in the first frequency band.

In one example the one or more corresponding initial stages comprise a single resonator, a pair of parallel and series resonators, or a plurality of parallel and series resonators.

In one example the one or more initial stages are configured to be coupled to an antenna port.

In another example the one or more initial stages are configured to be coupled to an antenna port and one or more further stages of the first time division duplex filter and the second time division duplex filter are coupled to the antenna port via the one or more initial stages.

In one example the second frequency band is either a frequency division duplex (FDD) frequency band or a second time division duplex frequency band.

In one example the secondary path is configured to include a duplexer configured to process signals in the second frequency band that utilize the frequency division duplex scheme.

In one example the secondary path is configured to include a third time division duplex filter configured to process receive signals in the second frequency band and a fourth filter configured to process transmit signals in the second frequency band, the third time division duplex filter and the fourth time division duplex filter including one or more corresponding initial stages that are identical.

In one example the first time division duplex filter and the second time division duplex filter may be implemented as a bulk acoustic wave (BAW) filter or a surface acoustic wave (SAW) filter.

In one example the secondary path is configured to include a third time division duplex filter configured to process receive signals in the second frequency band and a fourth filter configured to process transmit signals in the second frequency band, the third time division duplex filter and the fourth time division duplex filter including one or more corresponding initial stages that are identical, and the third time division duplex filter and the fourth time division duplex filter being implemented as a bulk acoustic wave (BAW) filter or a surface acoustic wave (SAW) filter.

In one example the first frequency band is between approximately 2,300 MHz to 2,400 MHz, or between approximately 2,496 MHz to 2,690 MHz.

In one example the second frequency band is between approximately 1,920 MHz to 1,980 MHz and approximately 2,110 MHz to 2,170 MHz, or between approximately 1,710 MHz to 1,785 MHz and approximately 1,805 MHz to 1,880 MHz, or between approximately 2,500 MHz to 2,570 MHz and approximately 2,620 MHz to 2,690 MHz, or between approximately 1,850 MHz to 1,915 MHz and approximately 1,930 MHz to 1,995 MHz, or between approximately 1,880 MHz to 1,920 MHz, or between approximately 1,710 MHz to 1,780 MHz and approximately 2,110 MHz to 2,200 MHz.

In one example the first frequency band is between approximately 2,300 MHz to 2,400 MHz, and the second frequency band is either between approximately 1,920 MHz to 1,980 MHz and approximately 2,110 MHz to 2,170 MHz, or between approximately 1,710 MHz to 1,785 MHz and approximately 1,805 MHz to 1,880 MHz, or between approximately 2,500 MHz to 2,570 MHz and approximately 2,620 MHz to 2,690 MHz.

In one example the first frequency band is between approximately 2,496 MHz to 2,690 MHz, and the second frequency band is between approximately 1,920 MHz to 1,980 MHz and approximately 2,110 MHz to 2,170 MHz, or between approximately 1,710 MHz to 1,785 MHz and approximately 1,805 MHz to 1,880 MHz, or between approximately 1,850 MHz to 1,915 MHz and approximately 1,930 MHz to 1,995 MHz, or between approximately 1,880 MHz to 1,920 MHz, or between approximately 1,710 MHz to 1,780 MHz and approximately 2,110 MHz to 2,200 MHz.

In one example the primary signal path includes a power amplifier (PA) configured to amplify signals for transmitting and a low noise amplifier (LNA) configured to amplify received signals.

According to another aspect of the present disclosure there is provided a front-end architecture configured to support carrier aggregation. The front-end architecture comprises a first node configured to be coupled to an antenna, a second node configured to be coupled to a transceiver, a primary signal path for processing a first frequency band, the first frequency band being a first time division duplex (TDD) frequency band, a secondary signal path for processing a second frequency band, the primary signal path including a first time division duplex filter configured to process receive signals in the first frequency band and a second time division duplex filter configured to process transmit signals in the first frequency band, and the first time division duplex filter and the second time division duplex filter including one or more corresponding initial stages that are identical.

According to another aspect of the present disclosure there is provided a front-end module configured to support carrier aggregation. The front-end module comprises a primary signal path for processing a first frequency band, the first frequency band being a first time division duplex (TDD) frequency band, a secondary signal path for processing a second frequency band, the primary signal path including a first time division duplex filter module configured to process receive signals in the first frequency band and a second time division duplex filter module configured to process transmit signals in the first frequency band, the first time division duplex filter module and the second time division duplex filter module including one or more filters that have one or more corresponding initial stages that are identical, an antenna switch module coupled to an antenna port and to at least the primary signal path and the secondary signal path, a low noise amplifier (LNA) module including one or more low noise amplifiers configured to amplify signals received at the antenna port via the first time division duplex filter module, and a power amplifier (PA) module including one or more power amplifiers configured to amplify signals received at a transceiver port for providing to the second time division duplex filter module.

One example further comprises a multiplexer coupled to the power amplifier module and the low noise amplifier module, the multiplexer being configured to direct amplified signals along a plurality of paths.

Another example further comprises a frequency division duplex (FDD) filter module configured to process receive signals in the second frequency band and transmit signals in the second frequency band.

According to another aspect of the present disclosure there is provided a wireless device comprising an antenna configured to receive and transmit a plurality of cellular frequency bands, a transceiver configured to provide signals to be transmitted and to be provided with received signals, and a front end module including a primary signal path for processing a first frequency band, the first frequency band being a first time division duplex (TDD) frequency band, a secondary signal path for processing a second frequency band, the primary signal path including a first time division duplex filter configured to process receive signals in the first frequency band and a second time division duplex filter configured to process transmit signals in the first frequency band, the first time division duplex filter and the second time division duplex filter including one or more corresponding initial stages that are identical, an antenna switch module coupled to an antenna port and to at least the primary signal path and the secondary signal path, a low noise amplifier module including one or more low noise amplifiers configured to amplify signals received at the antenna port via the first time division duplex filter, and a power amplifier module including one or more power amplifiers configured to amplify signals received at a transceiver port for providing to the second time division duplex filter.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments described herein are directed to a carrier aggregation architecture that enables reduced insertion loss, reduced switching losses and reduced degradation of a secondary component carrier (SCC) signal.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Cellular carrier aggregation (CA) can be supported by allowing two or more radio-frequency (RF) signals to be processed through a common path. For example, carrier aggregation can involve the use of a path for a plurality of bands having frequency ranges that are sufficiently separated. In such a configuration, simultaneous operation of more than one band is possible.

In such a carrier aggregation system, it is desirable to maintain a low noise figure (NF) for each RF signal. When two bands being aggregated are close in frequency, maintaining sufficient separation of the two bands is also desirable.

In the context of a receiver, carrier aggregation can allow concurrent processing of RF signals in a plurality of bands to provide, for example, high data rate capability. In particular, fourth generation (4G) and fifth generation (5G) handsets support a large number of CA-band combinations in a single circuit configuration.

Figure 1:
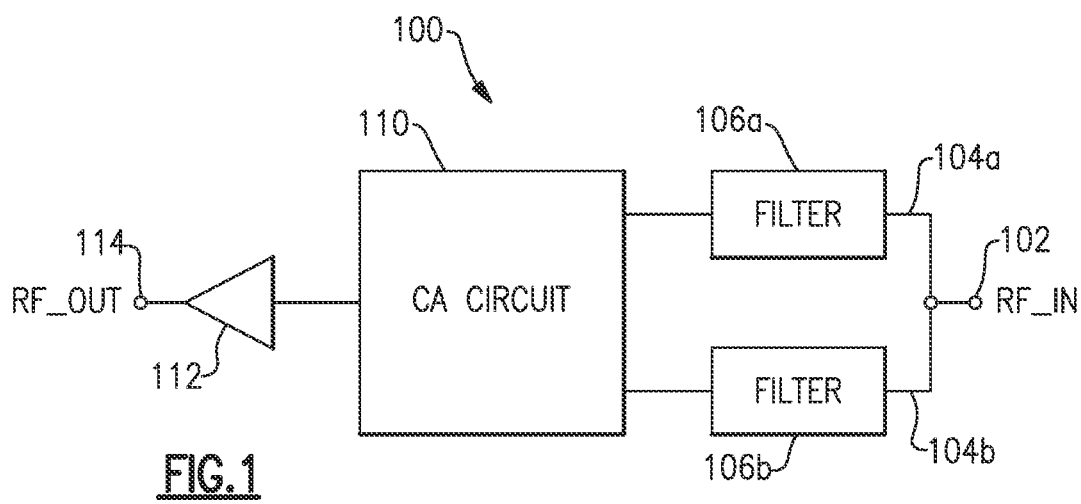
FIG. 1 is a schematic diagram of a first, known, carrier aggregation (CA) configuration that includes a CA circuit configured to receive an input and provide an output.

FIG. 1 is a schematic diagram of a carrier aggregation (CA) configuration 100 that includes a CA circuit 110 configured to receive a plurality of inputs and yield an output. The plurality of inputs can include a first RF signal and a second RF signal. The first RF signal can be provided to the CA circuit 110 from a common input node 102 (RF_IN), through a first path 104a that includes a first filter 106a. Similarly, the second RF signal can be provided to the CA circuit 110 from the common input node 102 (RF_IN), through a second path 104b that includes a second filter 106b. As described herein, the CA circuit 110 can be configured such that the output at a common output node 114 is a recombined RF signal that includes two separated frequency bands associated with the first and second RF signals. As also described herein, the CA circuit 110 can be configured to yield desirable performance features such as low loss, low noise figure, and/or high isolation between the two signal paths 104a, 104b.

Figure 2:
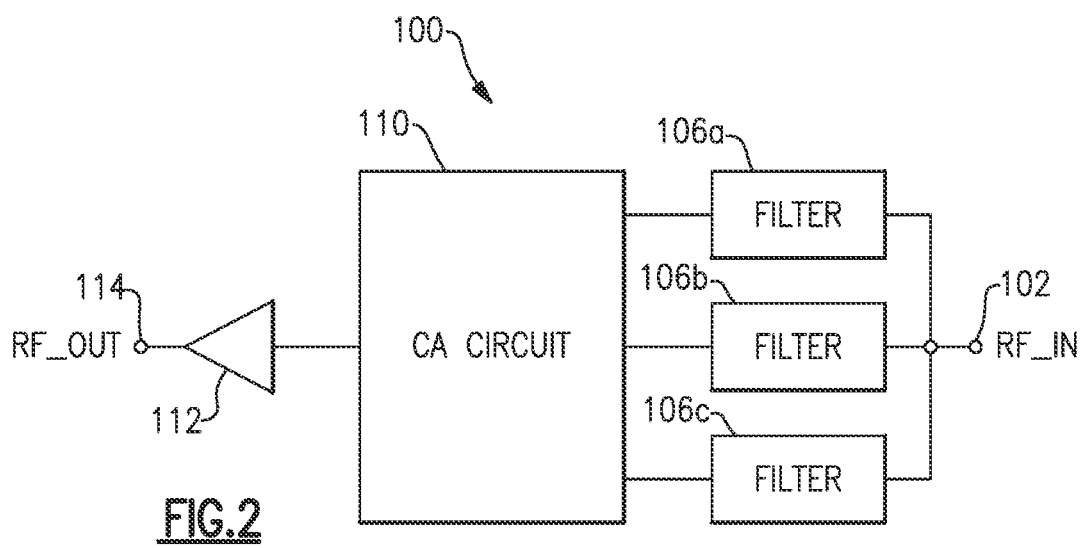
FIG. 2 is a schematic diagram of a second, known, CA configuration that can process more than two radio-frequency signals.

Various examples herein, including the example of FIG. 1, are described in the context of aggregating two frequency bands. However, it will be understood that one or more features of the present disclosure can be implemented in aggregation of more than two frequency bands. For example, FIG. 2 is a schematic diagram of a CA configuration 100 where three RF signals are separated at a common input node 102 (RF_IN), processed through their respective filters 106a, 106b, 106c, and recombined by a CA circuit 110 to yield a recombined RF signal at a common output node 114 (RF_OUT).

For the purpose of description, such signal paths can be referred to as "A", "B" and "C" bands, and such bands can include any combination of RF bands suitable for carrier aggregation. The frequency bands may be cellular frequency bands, such as UMTS (Universal Mobile Telecommunications System) frequency bands. For example, a first frequency band may be UMTS downlink or "Rx" Band 3, between 1805 megahertz (MHz) and 1880 MHz, a second frequency band may be UMTS downlink or "Rx" Band 66, between 2110 MHz and 2200 MHz, and a third frequency band may be UMTS downlink or "Rx" Band 40, between 2300 MHz and 2400 MHz.

Other downlink frequency bands may be used, such as those described below in Table 1 or other non-UMTS frequency bands.

TABLE 1

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |
| B45 | TDD | 1,447-1,467 | 1,447-1,467 |
| B46 | TDD | 5,150-5,925 | 5,150-5,925 |
| B65 | FDD | 1,920-2,010 | 2,110-2,200 |
| B66 | FDD | 1,710-1,780 | 2,110-2,200 |
| B67 | FDD | N/A | 738-758 |
| B68 | FDD | 698-728 | 753-783 |

Frequency bands that operate in a frequency division duplex (FDD) mode perform simultaneous transmit (Tx) and receive (Rx) operations via different frequencies. For example, Band 3 operates with transmit signals having frequencies of approximately 2500 MHz to approximately 2570 MHz, and operates with receive signals having frequencies of approximately 2620 MHz to approximately 2690 MHz. This is typically accomplished by the use of a duplexer, which combines Tx and Rx paths into a common terminal. By contrast, frequency bands that operate in a time division duplex (TDD) mode have a single frequency band that is utilized for both Tx and Rx operations. For example, Band 40 operates with a single frequency band of approximately 2300 MHz to approximately 2400 MHz.

Figure 3:
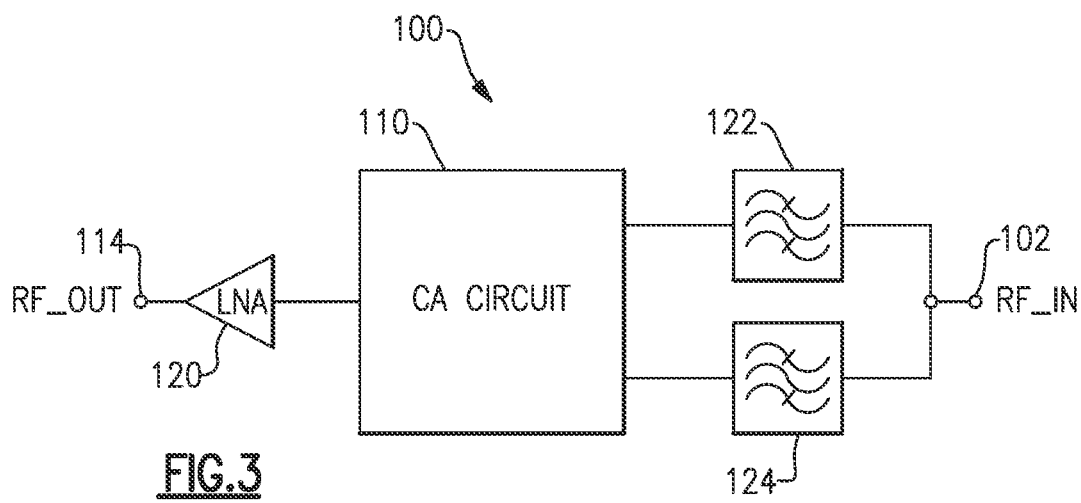
FIG. 3 is a schematic diagram of a third, known, CA circuit implemented as a receiver with a low-noise amplifier.

The CA configurations 100 of FIGS. 1 and 2 can be implemented in a number of RF applications. FIG. 3 shows a more specific example where a CA circuit 110 having one or more features as described herein can be implemented with a low-noise amplifier (LNA) in a receiver. The CA circuit 110 can be configured to receive a plurality of inputs and yield an output. The plurality of inputs can include a first RF signal and a second RF signal. The first RF signal can be provided to the CA circuit 110 from a common input node 102 (RF_IN), through a first path that includes a first band-pass filter 122*a*. Similarly, the second RF signal can be provided to the CA circuit 110 from the common input node 102 (RF_IN), through a second path that includes a second band-pass filter 122*b*. As described herein, the CA circuit 110 can be configured such that the output at a common output node 114 is a recombined RF signal that includes two separated frequency bands associated with the first and second RF signals. The CA circuit 110 may also be configured to yield desirable performance features such as low loss, low noise figure, and/or high isolation between the two input signal paths.

In FIG. 3, the recombined RF signal is shown to be provided to an LNA 130 to amplify and thereby generate a low-noise amplified output signal at an output node 114. The LNA 130 can be configured to operate with a sufficiently wide bandwidth to effectively amplify the first and second bands of the recombined RF signal.

It will be appreciated that in some embodiments separate LNAs may be implemented on each signal path and the RF signal is recombined after each constituent signal has been amplified. In some embodiments, the pass-band filters 122 can be implemented in a number of ways, including, for example, as surface acoustic wave (SAW) filters. It will be understood that other types of filters can be utilized.

For downlink carrier aggregation, the bandwidths of multiple receive bands are combined to increase throughput (i.e., the rate at which a signal is processed) and improve user experience. However, the use of TDD frequency band in legacy architecture leads to several drawbacks. As indicated above, in a TDD mode of operation both transmit (Tx) and receive (Rx) operations are undertaken using a single frequency band. Legacy architectures typically provide a common signal path and components for both transmit and receive operations in order to reduce chip-space. However, the transmit and receive operations have divergent requirements and it is therefore impossible to optimize the common circuit components on the TDD signal path to perfectly support both operations simultaneously.

Figure 4:
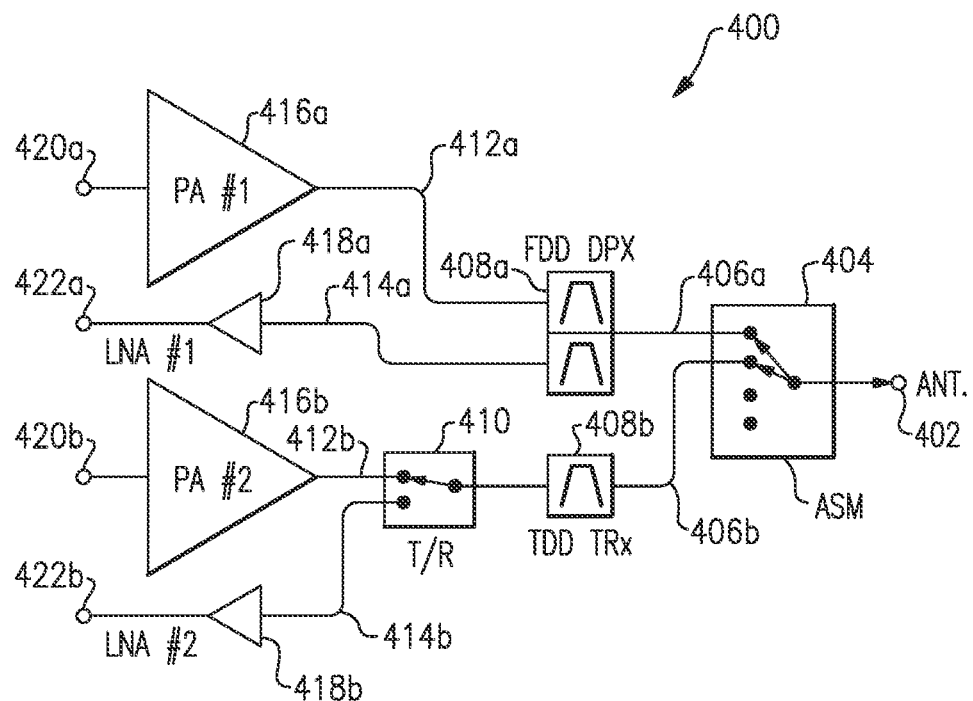
FIG. 4 is a schematic diagram of a known CA architecture that uses a combination of time division duplex (TDD) and frequency division duplex (FDD) frequency bands for performing carrier aggregation.

FIG. 4 is a schematic diagram of a known architecture 400 that enables carrier aggregation (CA) to be performed using a combination of TDD and FDD frequency bands. In the TDD-FDD architecture shown in FIG. 4, signals may be received or transmitted via a common node 402 that is coupled to an antenna. An antenna switch module (ASM) 404 is configured to switch between a first signal path 406*a* and a second signal path 406*b*, whereby one of these paths may be selected for use as the primary component carrier (PCC) path while the other path is selected for use as the secondary component carrier (SCC) path. For downlink CA, the PCC path provides both receive and transmit signals, whereas the SCC path provides receive signals only. For uplink CA, both the PCC and the SCC paths provide receive and transmit signals.

In the example of FIG. 4, the first signal path 406*a* is configured to process FDD frequency bands and is used as the SCC path while the second signal path 406*b* is configured to process TDD frequency bands and is used as the PCC path. The ASM can be a single pole multiple throw (SPMT) switch with individual throws coupled to individual filters and/or individual duplexers.

In the example shown in FIG. 4, the first signal path 406*a* comprises an FDD duplexer 408*a*, a transmit path 412*a* and a receive path 414*a*. The transmit path 412*a* comprises a power amplifier (PA) 416*a* configured to amplify signals for transmission by the antenna, and an output node 420*a* coupled to PA 416*a* that is configured to provide a signal for amplification and transmission to PA 416*a*. The receive path 414*a* comprises a low noise amplifier (LNA) 418*a* configured to amplify signals received by the antenna, and an input node 422*a* coupled to LNA 418*a* configured to receive the amplified signal from LNA 418*a*.

The second signal path 406*b* comprises a single TDD filter 408*b*, a transmit/receive switch 410, a transmit path 412*b* and a receive path 414*b*. The transmit path 412*b* comprises a power amplifier (PA) 416*b* configured to amplify signals for transmission by the antenna, and an output node 420*b* coupled to PA 416*b* and configured to provide a signal for amplification and transmission to PA 416*b*. The receive path 414*b* comprises a low noise amplifier (LNA) 418*b* configured to amplify signals received by the antenna, and an input node 422*b* coupled to LNA 418*b* configured to receive the amplified signal from LNA 418*b*.

Since FDD modes of operation use different frequency regimes for transmitting and receiving a signal, the first signal path 406*a* carrying the FDD signals accommodates two separate filters which are implemented as an FDD duplexer in the example of FIG. 4. Each of these FDD filters may be individually optimized as a transmit or a receive filter for a particular operational frequency regime. By contrast, TDD modes of operation use a single frequency to both transmit and receive signals, and so the second signal path 406*b* accommodates a common TDD filter for both Rx and Tx operations.

Figure 5:
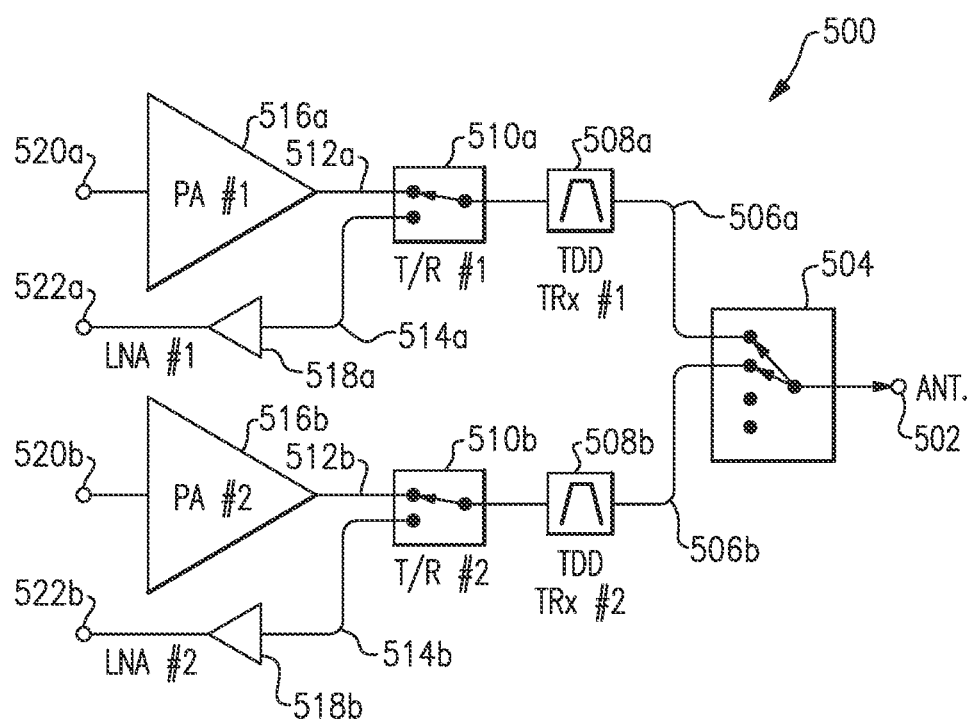
FIG. 5 is a schematic diagram of an alternative known CA architecture that uses a combination of two TDD frequency bands for performing carrier aggregation.

FIG. 5 shows an alternative known architecture 500 that uses a combination of two TDD frequency bands for performing carrier aggregation. In the TDD-TDD architecture shown in FIG. 5, signals may be received or transmitted via a common node 502 that is coupled to an antenna. An antenna switch module (ASM) 504 is configured to switch between a first signal path 506*a* and a second signal path 506*b*. In the example shown in FIG. 5, the first signal path 506*a* is configured to process a first TDD frequency band and the second signal path 506*b* is configured to process a second TDD frequency band. Either of the two TDD frequency bands may be the PCC while the other TDD frequency band may be the SCC.

In the example shown in FIG. 5, the first signal path 506*a* comprises a first TDD filter 508*a*, a first transmit/receive switch 510*a*, a transmit path 512*a* and a receive path 514*a*. The transmit path 512*a* comprises a power amplifier (PA) 516*a* configured to amplify signals for transmission by the antenna, and an output node 520*a* coupled to PA 516*a* and configured to provide a signal for amplification and transmission to PA 516*a*. The receive path 514*a* comprises a low noise amplifier (LNA) 518*a* configured to amplify signals received by the antenna, and an input node 522a coupled to LNA 518a configured to receive the amplified signal from LNA 518a.

The second signal path 506b comprises a second TDD filter 508b, a second transmit/receive switch 510b, a transmit path 512b and a receive path 514b. The transmit path 512b comprises a power amplifier (PA) 516b configured to amplify signals for transmission by the antenna, and an output node 520b coupled to PA 516b and configured to provide a signal for amplification and transmission to PA 516b. The receive path 514b comprises a low noise amplifier (LNA) 518b configured to amplify signals received by the antenna, and an input node 522b coupled to LNA 518b configured to receive the amplified signal from LNA 518b.

Typically, for the architectures shown in FIGS. 4 and 5, mid-band or high-band frequency bands may be use as the FDD band(s). In a particular embodiment, the first signal path 406a is configured to use Band 1, Band 3, Band 7, Band 25, Band 39 and/or Band 66 as the FDD or TDD band(s), whereas the second signal path 406b is configured to use Band 40 and/or Band 41 as the TDD band(s). In embodiments where the second signal path 406b processes a Band 41 signal, the first signal path 406a typically processes Band 1, Band 3, Band 25, Band 39 or Band 66 signals. Where the second signal path 406a processes Band 40, the first signal path 406a typically processes Band 1, Band 3 or Band 7 signals.

In the example shown in FIG. 4, the first signal path 406a is configured to provide an FDD frequency band as the secondary component carrier (SCC) and the second signal path 406b is configured to provide a TDD frequency band as the primary component carrier (PCC). In FIG. 5, a first TDD frequency band acts as the primary component carrier (PCC) and a second TDD frequency band acts as the secondary component carrier (SCC) with respective transmit/receive switches 410 being used to provide a transmit signal to a TDD PA and a receive signal to a TDD LNA.

However, as indicated above, a single transmit/receive (TRx) filter cannot be fully optimized for both Tx and Rx functions. Accordingly, when a single TDD TRx filter is used for processing a PCC signal the TRx filter should completely reject signal noise and harmonics originating from the user equipment to ensure a transmitted signal is sufficiently clean while also completely rejecting blockers, signal noise and interference from the local environment for a received signal. The common TRx filter therefore needs to block a wide range of frequencies, leading to increased out-of-band impedance and increased insertion loss.

In addition, as shown in the architecture of FIGS. 4 and 5, the TDD signal path includes two switches, which increases the PCB footprint and increases switch losses. Cascading the ASM with a transmit/receive switch, as shown in FIGS. 4 and 5, may result in significant switch losses of approximately 0.25 dB for mid-band frequencies and approximately 0.4 dB for high-band frequencies.

It would therefore be preferable to have separate TDD Tx and Rx filters in order to optimize the performance of each filter and also eliminate the requirement for the transmit/receive switch. However this is not straightforward to achieve in practice.

This is firstly because of the additional chip space required by the extra filters. Additionally, using separate Tx and Rx filters require the transmitted and received RF signals to be switch-combined but switching between non-ideal filters (i.e., filters having a finite quality, Q, factor) results in loading effects on another signal path. For example, if the TDD signal path is used as a primary component carrier (PCC) path then switching between the TDD Tx and Rx filters results in an out of band impedance being presented on the secondary component carrier (SCC) path. Accordingly, the received SCC signal will experience an amplitude and phase change due to the out-of-band impedance presented by one or more of the TDD Rx and Tx filters.

Additionally, amplitude and phase changes can also derive from differences in signal transmission path length and/or a lack of synchronicity between different Evolved Node B (eNodeB) base stations. Such a scenario results in misalignment between the transmit and receive time slots, for example when a switch from a transmit mode to a receive mode occurs in the middle of a receive slot rather than at the beginning of the receive slot. This also creates a loading effect and degradation to the received SCC signal.

Figure 6:
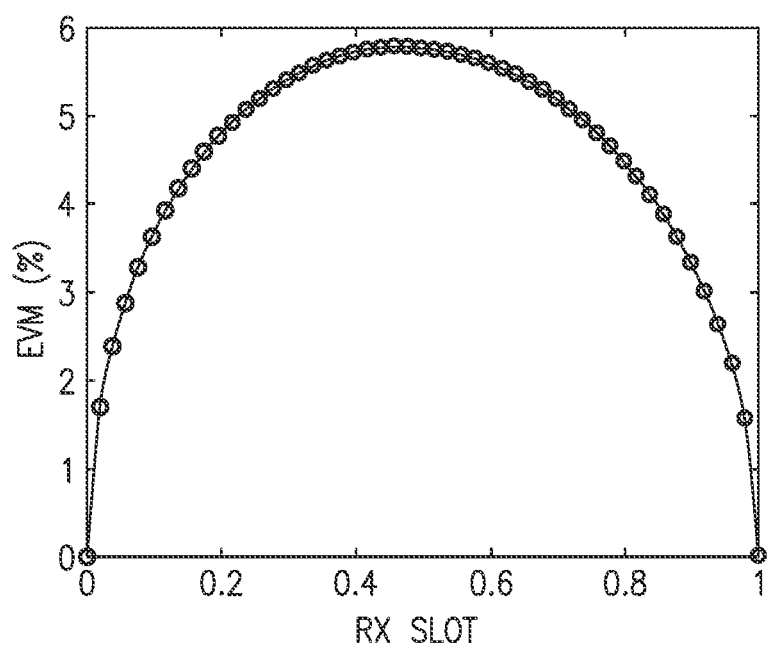
FIG. 6 is a graph showing the calculated degradation effect on a received signal throughout a normalized time slot for known CA architectures.

FIG. 6 shows the degradation effect that an amplitude change has on a received signal when switching between Rx and Tx modes at various times throughout a normalized time slot. The example shown in FIG. 6 indicates how a simulated 1 dB amplitude shift affects a FDD Rx signal, which may be caused by the loading effects outlined above, as quantified by the error vector magnitude (EVM) of the Rx signal.

As shown in FIG. 6, if the amplitude shift occurs at the boundaries of the receive time slot (i.e., at "0" and "1" on the x-axis), then there is no change to the Rx signal. This is because in ideal circumstances a modem expects the switch between transmit and receive modes to occur close to the transmit/receive slot boundary and so the modem calculates compensation coefficients at the beginning of each time slot to compensate for the gain change that occurs during the mode switch. However, if the mode switch occurs in the middle of the time slot then the compensation coefficients used during the time slot are no longer valid and are unable to compensate for the sudden amplitude or phase shift. Accordingly, changes that occur towards the middle of the time slot are the furthest from the slot boundaries and so have the largest predicted EVM values. As shown in FIG. 6, the peak EVM value is nearly 6% towards the middle of the slot (i.e., at approximately "0.5" on the x-axis) but an EVM value in excess of 5% occurs in the central portion of the time slot (i.e., between approximately "0.25" and approximately "0.75" on the x-axis).

Under 3GPP standards, modulation schemes such as 256-QAM require a maximum EVM of 3.5% throughout an entire transmission architecture, including the baseband modem, RF Integrated Circuit and front-end module. Accordingly, it is desirable to maintain a maximum EVM at 2% or less within the front-end module. EVM values in excess of about 2% result in significant degradation in the Rx signal meaning that the signal packet needs to be resent by the eNodeB and thus severely degrading the achievable throughput. However, more stringent future modulation schemes such as 1024-QAM may require the maximum EVM value to be even lower than 2%.

It should be noted that the known architectures shown in FIG. 4 and FIG. 5 do not result in a degradation of the Rx signal in the manner described above, because there is only a single TDD filter for the PCC path and so the input impedance presented by the common TDD filter does not change. If FDD frequency bands were used as the PCC instead of TDD frequency bands, the FDD frequency bands use separate bands to transmit and receive signals and so have respective Rx and Tx FDD filters that are each optimized for their particular function. Accordingly, no switching between filters is required for either of these scenarios and so the problems described above do not occur.

Figure 7:
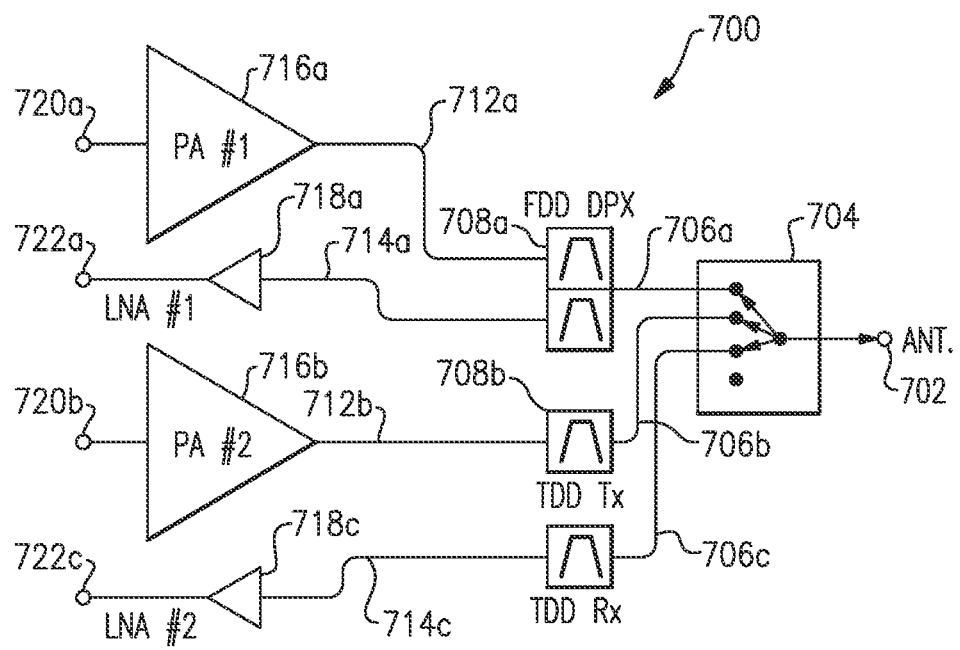
FIG. 7 is a schematic diagram of a first CA architecture according to aspects of the present disclosure.

FIG. 7 shows a schematic diagram of a first architecture 700 that embodies aspects of the present disclosure. Architecture 700 enables carrier aggregation (CA) to be performed using a combination of TDD and FDD frequency bands. In the TDD-FDD architecture shown in FIG. 7, signals may be received or transmitted via a common node 702 that is coupled to an antenna. An ASM 704 is configured to switch between a first signal path 706*a*, a second signal path 706*b*, and a third signal path 706*c*. In preferred embodiments, the first signal path 706*a* is configured as a SCC path, the second signal path 706*b* is configured as a PCC Tx path and third signal path 706*c* is configured as a PCC Rx path.

The first signal path 706*a* of FIG. 7 includes the same features as the first signal path 406*a* of FIG. 4.

The second signal path 706*b* includes a single TDD Tx filter 708*b* and a transmit path 712*b* including a power amplifier (PA) 716*b* configured to amplify signals for transmission by the antenna, and an output node 720*b* coupled to PA 716*b* and configured to provide a signal for amplification and transmission to PA 716*b*.

The third signal path 706*c* include a single TDD Rx filter 708*c* and a receive path 714*c* including a low noise amplifier (LNA) 718*c* configured to amplify signals received by the antenna, and an input node 722*c* coupled to LNA 718*c* configured to receive the amplified signal from LNA 718*c*.

Figure 8:
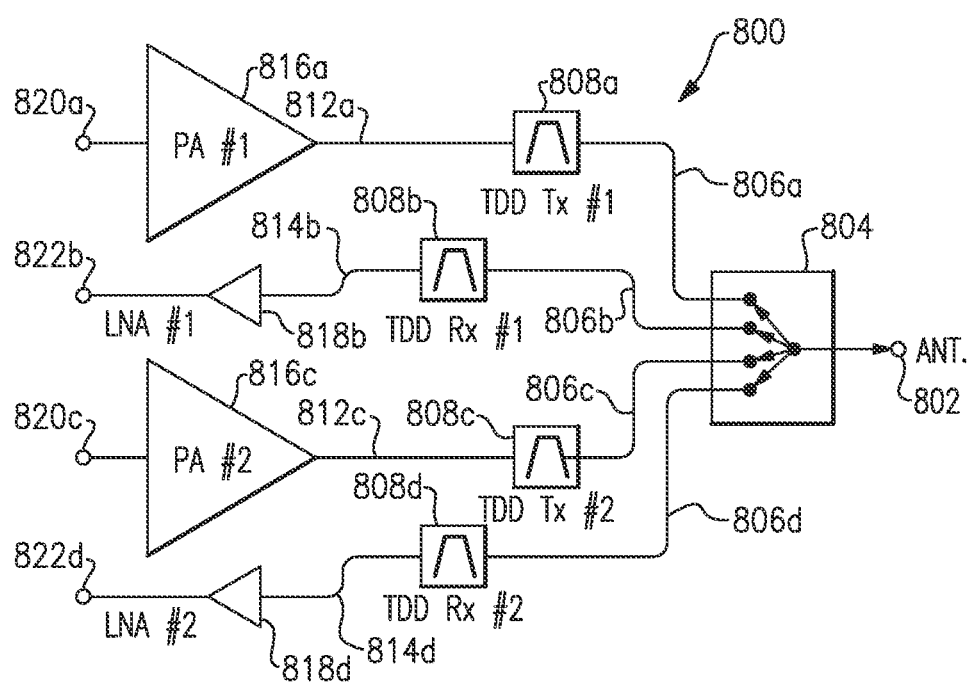
FIG. 8 is a schematic diagram of a second CA architecture according to aspects of the present disclosure.

FIG. 8 shows a schematic diagram of a second architecture 800 that embodies aspects of the present disclosure. Architecture 800 enables carrier aggregation (CA) to be performed using a combination of two TDD frequency bands. In the TDD-TDD architecture shown in FIG. 8, signals may be received or transmitted via a common node 802 that is coupled to an antenna. An ASM 804 is configured to switch between a first signal path 806*a*, a second signal path 806*b*, a third signal path 806*c*, and a fourth signal path 806*d*.

The first signal path 806*a* of FIG. 8 is configured for a first TDD frequency band and includes a single TDD Tx filter 808*a* and a transmit path 812*a* including a power amplifier (PA) 816*a* configured to amplify signals for transmission by the antenna, and an output node 820*a* coupled to PA 816*a* and configured to provide a signal for amplification and transmission to PA 816*a*.

The second signal path 806*b* is also configured for the first TDD frequency band and includes a single TDD Rx filter 808*b* and a receive path 814*b* including a low noise amplifier (LNA) 818*b* configured to amplify signals received by the antenna, and an input node 822*b* coupled to LNA 818*b* configured to receive the amplified signal from LNA 818*b*.

The third signal path 806*c* of FIG. 8 includes the same features as the first signal path 806*a*, but is configured for a second TDD frequency band.

The fourth signal path 806*d* of FIG. 8 includes the same features as the second signal path 806*b*, but is also configured for the second TDD frequency band.

In certain embodiments, the first signal path 806*a* is configured as an SCC Tx path, the second signal path 806*b* is configured as an SCC Rx path, the third signal path 806*c* is configured as a PCC Tx path, and a fourth signal path 806*d* is configured as a PCC Rx path. However, it will be appreciated that in other embodiments the first signal path 806*a* and second signal path 806*b* may be configured as PCC paths, while the third signal path 806*c* and the fourth signal path 806*d* may be configured as SCC paths.

Figure 9:
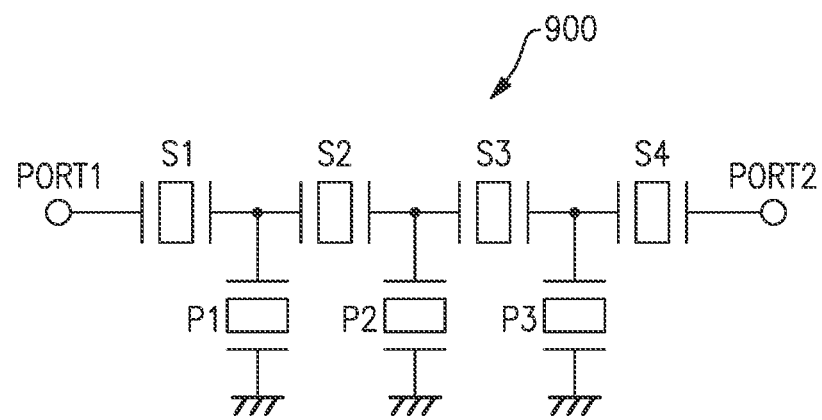
FIG. 9 is a schematic diagram of a known filter design.

FIG. 9 is a schematic diagram of a filter 900, such as the TDD Tx or Rx filters shown in FIG. 7 or FIG. 8. The example filter 900 shown in FIG. 9 is configured as a passband or ladder filter and includes a plurality of bulk acoustic wave (BAW) resonators. However, it will be appreciated that high performance filters used in cellular applications may be implemented by bulk acoustic wave resonators (BAW), surface acoustic wave resonators (SAW), or any other resonator with a suitably high Q factor.

The ladder filter 900 includes a plurality of series resonators S1, S2, S3, and S4 coupled in series between an input port, PORT1, and an output port, PORT2. The filter 900 also includes a plurality of parallel resonators P1, P2, and P3 connected between terminals of the series resonators and ground. Although the example of FIG. 9 includes four series resonators S1, S2, S3, S4 and three parallel resonators P1, P2, P3, it will be appreciated that more or fewer series and/or parallel resonators may be included in filter 900.

The resonators of the ladder filter 900 may be grouped into different stages. In some embodiments, a filter stage may comprise a single resonator, a pair of parallel and series resonators, or a plurality of parallel and series resonators. An initial, or primary, filter stage may comprise a group of one or more of the series and parallel resonators that are located at an antenna-side of the filter 900. One or more subsequent filter stages may comprise a group of one or more of the series and parallel resonators that are coupled to the one or more initial stages on the opposite side (i.e., the user equipment side) of the initial filter stage from the antenna.

Figure 10A:
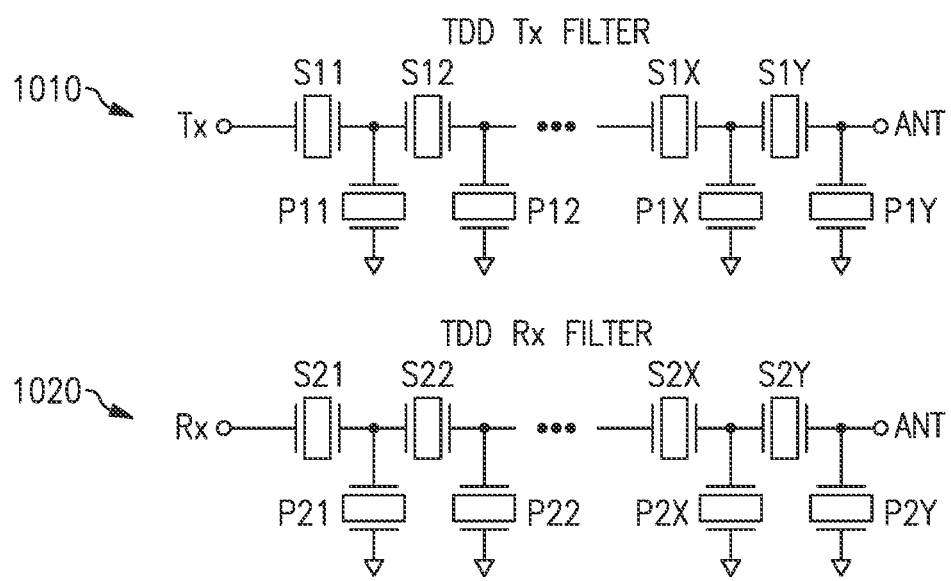
FIG. 10A is a schematic diagram of a filter design according to aspects of the present disclosure.

FIG. 10A is a schematic diagram of a TDD Tx filter 1010, and a TDD Rx filter 1020 that embody aspects of the invention and include two pairs of parallel and series resonators. As for FIG. 9, the example TDD Tx filter 1010 and TDD Rx filter 1020 are configured as passband or ladder filters and may include a plurality of bulk acoustic wave (BAW) resonators, surface acoustic wave resonators (SAW), or any other resonator with a suitably high Q factor. The TDD TX filter 1010 and TDD Rx filter 1020 may be implemented in the architectures of FIG. 7 and/or FIG. 8 in order to provide the advantages described herein.

The TDD Tx filter 1010 shown in FIG. 10A includes a plurality of series resonators S11, S12, S1X, and S1Y coupled in series between a transmit port, Tx, and an antenna port, ANT. The TDD Tx filter 1010 also includes a plurality of parallel resonators P11, P12, P1X, and P1Y connected between terminals of the respective series resonators and ground. A Tx initial filter stage is formed from resonators S1X, S1Y, P1X, and P1Y and a subsequent filter stage is formed from resonators S11, S12, P11, and P12.

The TDD Rx filter 1020 shown in FIG. 10A includes a plurality of series resonators S21, S22, S2X, and S2Y coupled in series between a receive port, Rx, and an antenna port, ANT. The TDD Rx filter 1020 also includes a plurality of parallel resonators P21, P22, P2X, and P2Y connected between terminals of the respective series resonators and ground. An Rx initial filter stage is formed from resonators S2X, S2Y, P2X, and P2Y and a subsequent filter stage is formed from resonators S21, S22, P21, and P22. The skilled person will appreciate that further filter stages may be provided between the initial filter stage and the subsequent filter stage, which are not shown in the example of FIG. 10A.

In the example of FIG. 10A, the Rx initial filter stage is identical to, or substantially the same as, the Tx initial filter stage. In other words, the initial filter stage is common to both the Rx filter and the Tx filter such that resonator S1X has substantially the same characteristics as resonator S2X, resonator S1Y has substantially the same characteristics as resonator S2Y, resonator P1X has substantially the same characteristics as resonator P2X, and resonator P1Y has substantially the same characteristics as resonator P2Y.

Figure 10B:
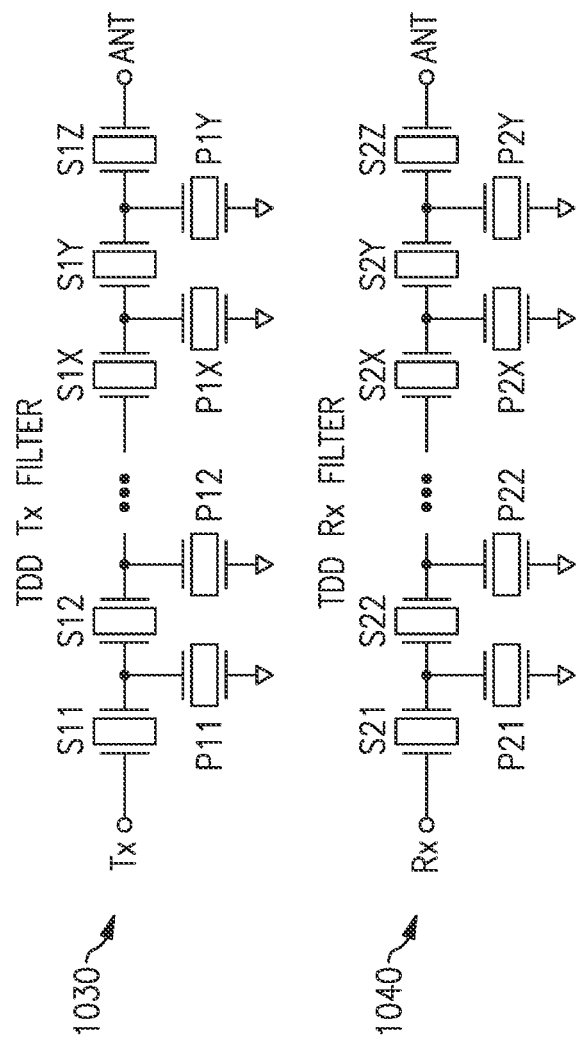
FIG. 10B is a schematic diagram of an alternative filter design according to aspects of the present disclosure.

FIG. 10B is a schematic diagram of an alternative filter design for the TDD Tx and Rx filters shown in FIG. 10A. The filter design shown in FIG. 10B is the same as the filter design of 10A, but further includes an additional series resonator at the antenna side. Accordingly, the example filters shown in FIG. 10B include a first TDD Tx filter 1030, and a TDD Rx filter 1040, each filter comprising two parallel resonators and three series resonators.

The TDD Tx filter 1030 of FIG. 10B includes a plurality of series resonators S11, S12, S1X, S1Y, and S1Z, and a plurality of parallel resonators P11, P12, P1X, and P1Y. A Tx initial filter stage is formed from resonators S1X, S1Y, S1Z, P1X, and P1Y and a subsequent Tx filter stage is formed from resonators S11, S12, P11, and P12.

The TDD Rx filter 1040 of FIG. 10B includes a plurality of series resonators S21, S22, S2X, S2Y, and S2Z and a plurality of parallel resonators P21, P22, P2X, and P2Y. An Rx initial filter stage is formed from resonators S2X, S2Y, S2Z P2X, and P2Y and a subsequent Rx filter stage is formed from resonators S21, S22, P21, and P22.

As for the filters of FIG. 10A, in FIG. 10B the Rx initial filter stage is identical to, or substantially the same as, the Tx initial filter stage. In other words, the initial filter stage is common to both the Rx filter and the Tx filter such that resonator S1X has substantially the same characteristics as resonator S2X, resonator S1Y has substantially the same characteristics as resonator S2Y, resonator S1Z has substantially the same characteristics as resonator S2Z, resonator P1X has substantially the same characteristics as resonator P2X, and resonator P1Y has substantially the same characteristics as resonator P2Y.

The TDD Tx filter 1030 and TDD Rx filter 1040 may include BAW resonators, SAW resonators, or any other resonator with a suitably high Q factor, and may be implemented in the architectures of FIG. 7 and/or FIG. 8 in order to provide the advantages described herein.

In some embodiments, the TDD Rx and Tx filters comprise a plurality of identical and corresponding, i.e., common, initial filter stages. In preferred embodiments, the TDD Rx and Tx filters comprise a plurality of subsequent filter stages. The precise number of filter stages required may depend on the frequency bands being used as the PCC and the SCC.

The input impedance of the initial filter stages dominates the total input impedance presented by the TDD filter as a whole. Accordingly, ensuring that one or more of the initial filter stages of the TDD Rx and TDD Tx filters are identical results in the same input impedance being presented to the ASM. Ensuring that the TDD Rx and TDD Tx filters present the same input impedance to the ASM means that switching between Rx and Tx modes does not cause any amplitude or phase changes on the SCC path, unlike in known architectures.

The subsequent filter stages have relatively little impact on the input impedance presented to the ASM, but enable the respective filter to be tuned for optimum Rx or Tx performance for a particular TDD frequency band.

Accordingly, embodiments of the invention advantageously provide optimized TDD Rx and Tx filters that do not suffer from degraded throughput and provide reduced switch losses and insertion losses by removing the requirement for a TDD Rx/Tx switch that is cascaded with the ASM.

Figure 11:
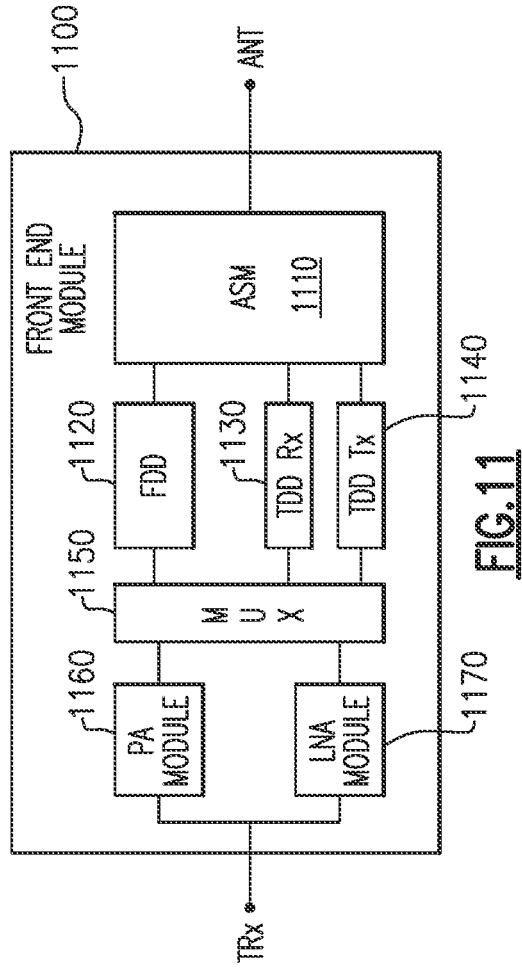
FIG. 11 is a schematic diagram of a front-end module for carrier aggregation according to aspects of the present disclosure.

FIG. 11 is a schematic diagram of a front-end module 1100 for carrier aggregation that embodies aspects of the invention. The front-end module 1100 includes an ASM 1110 coupled to an antenna port (ANT). The ASM is configured to direct transmission signals to the antenna port for transmission over an antenna. Similarly, the ASM is configured to direct received signals from the antenna port to targeted filters and/or duplexers. The ASM can be a single pole multiple throw (SPMT) switch with individual throws coupled to the targeted filters and/or duplexers.

For embodiments that use FDD frequency bands as the SCC, the front-end module 1100 may also include an FDD filter module 1120 including one or more FDD filters to filter FDD signals in one or more FDD cellular frequency bands. As described above, the FDD filter module 1120 can include a duplexer configured to process signals that utilize a frequency division duplex scheme. The FDD filter module 1120 is coupled to the ASM 1110 to receive FDD signals for directing to a low noise amplifier.

The front-end module 1100 includes a TDD Rx filter module 1130 including one or more TDD Rx filters configured to filter received TDD signals in one or more TDD cellular frequency bands. The front-end module 1100 also includes a TDD Tx filter module 1140 including one or more TDD Tx filters configured to filter TDD signals for transmitting in one or more TDD cellular frequency bands. The TDD Rx filter module 1130 is coupled to the ASM 1110 to direct received TDD signals to low noise amplifiers for amplification. The TDD Tx filter module 1140 is coupled to a transceiver port (TRx) via a multiplexer to receive TDD signals for transmission.

Accordingly, the ASM 1100 is configured to direct signals between the FDD filter and/or the TDD filters and the antenna port.

It will be understood that one or more signals or cellular frequency bands may be directed between the ASM 1110 and the FDD filter module 1120, and one or more signals or cellular frequency bands may be directed between the ASM 1110 and each of the TDD Rx filter module 1130 and Tx filter module 1140. It is also to be understood that the front-end module 1100 includes impedance matching components, filters, phase shifting components, and the like (not shown in FIG. 11) to reduce signal degradation within the front end module.

The front-end module 1100 may include a multiplexer (MUX) 1150 configured to direct signals along a plurality of paths. The multiplexer 1150 can be implemented as a switch and can include one or more poles and/or throws. The multiplexer 1150 can be configured to receive signals from a power amplifier module for transmission and to direct those signals along a plurality of paths to the antenna port. The multiplexer 1150 can be further configured to receive signals from one or more of the FDD filters and/or the TDD Rx filters and/or the TDD Tx filters and to direct those signals along a plurality of paths to a power amplifier module or low noise amplifier module for further processing.

The front-end module 1100 includes a power amplifier module 1160 having one or more power amplifiers (PAs) configured to amplify signals received at a transceiver port (TRx). The front-end module 1100 may further include an envelope tracker configured to modify a supply voltage to the power amplifiers to increase efficiency of the one or more power amplifiers. In preferred embodiments, such as the example shown in FIG. 11, the envelope tracker is implemented as part of the power amplifier module 1160.

The front-end module 1100 also includes a low noise amplifier (LNA) module 1170 that includes one or more low noise amplifiers configured to amplify signals received at the antenna port. The low noise amplifier module 1170 is coupled to the FDD filter module 1120 and the TDD Rx filter module 1130 to amplify received signals that utilize the time division duplex scheme and provides the amplified signals to the transceiver port.

Figure 12:
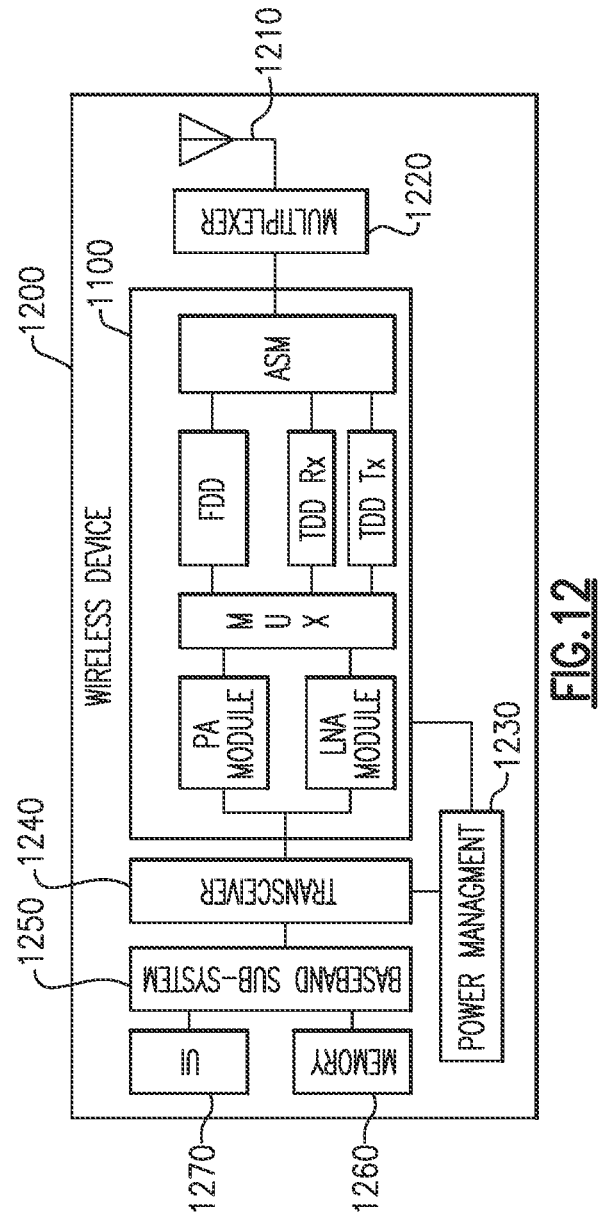
FIG. 12 is a schematic diagram of a wireless device for carrier aggregation according to aspects of the present disclosure.

FIG. 12 is a schematic diagram of a wireless device 1200 that includes the front-end module 1100 of FIG. 11 and embodies aspects of the invention. The wireless device 1200 can be, for example but not limited to, a portable telecommunication device, such as a mobile cellular-type telephone.

The wireless device 1200 can include an antenna 1210, multiplexer 1220, front-end module 1100, power management module 1230, a transceiver 1240, a baseband sub-system 1250, a memory 1260 and a user interface 1270.

As described above, the front-end module 1100 can include an antenna switch module (ASM) 1110, FDD filter module 1120, TDD Rx filter module 1130, TDD Tx filter module 1140, a multiplexer 1150, a power amplifier (PA) module 1160, and low noise amplifier (LNA) module 1170.

In the example wireless device 1200, the front-end module 1100 is coupled to the antenna 1210 via the multiplexer 1220. The multiplexer 1220 is configured to direct received signals to the front-end module 1100 for processing.

Signals to be transmitted can be routed from the transceiver 1240 to the PA module of the front-end module 1110 where the signals are amplified. The signals are then routed through the multiplexer, filters and/or duplexers, and the ASM before being passed to the antenna 1210 for transmission. Similarly, received signals are routed from the antenna 1210 through the multiplexer 1220 and directed to the front-end module 1110. The signals are routed and filtered using the ASM 1110 and the filters/duplexers before being amplified by the LNA module 1170. Amplified received signals from the LNA module 1170 can then be routed to the transceiver 1240.

In some embodiments the wireless device 1200 may include a plurality of front-end modules, each for a particular combination of RF frequency bands. In such embodiments, the multiplexer 1220 may direct received signals to one or more targeted front-end module(s) that may be configured to handle signals within the corresponding frequency bands. For example, the wireless device can include a low-band front-end module configured to handle low band cellular signals, a mid-band front-end module configured to handle mid-band cellular signals, and a high-band front-end module configured to handle high-band cellular signals. In some embodiments, the wireless device may include a front-end module configured to handle mid-band and high-band signals together.

The transceiver 1240 interacts with the baseband sub-system 1250 that is configured to provide conversion between data and/or voice signals suitable for a user and RF signals suitable for the transceiver. The transceiver 1240 is connected to a power management module 1230 (e.g., a power management integrated circuit or PMIC) that is configured to manage power for the operation of the wireless device. Such power management can control operations of the baseband sub-system and the front-end modules.

The baseband sub-system 1250 is connected to a memory 1260 that is configured to store data and/or instructions to facilitate the operation of the wireless device 1200, and/or to provide storage of information for the user. The baseband sub-system 1250 is also connected to a user interface 1270 to facilitate various input and output of voice and/or data provided to and received from the user.

A number of other wireless device configurations can utilize one or more features described herein. For example, a wireless device can include additional antennas such as diversity antenna, and additional connectivity features such as Wi-Fi, Bluetooth, and GPS.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A carrier aggregation circuit comprising:
a primary signal path for processing a first frequency band, the first frequency band being a first time division duplex (TDD) frequency band;
a secondary signal path for processing a second frequency band;
the primary signal path including a first time division duplex filter configured to process receive signals in the first frequency band and a second time division duplex filter configured to process transmit signals in the first frequency band; and
the first time division duplex filter and the second time division duplex filter including one or more corresponding initial filter stages that are identical, the one or more corresponding initial filter stages comprising a single resonator, a pair of parallel and series resonators, or a plurality of parallel and series resonators.

2. The carrier aggregation circuit of claim 1 wherein the first frequency band is a primary component carrier (PCC) and the second frequency band is a secondary component carrier (SCC).

3. The carrier aggregation circuit of claim 1 wherein the first time division duplex filter includes one or more further filter stages coupled to the one or more initial filter stages and optimized for processing receive signals in the first frequency band.

4. The carrier aggregation circuit of claim 1 wherein the second time division duplex filter includes one or more further filter stages coupled to the one or more initial filter stages and optimized for processing transmit signals in the first frequency band.

5. The carrier aggregation circuit of claim 1 wherein the one or more initial filter stages are configured to be coupled to an antenna port.

6. The carrier aggregation circuit of claim 1 wherein the one or more initial filter stages are configured to be coupled to an antenna port and one or more further filter stages of the first time division duplex filter and the second time division duplex filter are coupled to the antenna port via the one or more initial filter stages.

7. The carrier aggregation circuit of claim 1 wherein the second frequency band is either a frequency division duplex (FDD) frequency band or a second time division duplex frequency band.

8. The carrier aggregation circuit of claim 1 wherein the secondary path is configured to include a duplexer configured to process signals in the second frequency band that utilize a frequency division duplex scheme.

9. The carrier aggregation circuit of claim 1 wherein the secondary path is configured to include a third time division duplex filter configured to process receive signals in the second frequency band and a fourth filter configured to process transmit signals in the second frequency band, the third time division duplex filter and the fourth time division duplex filter including one or more corresponding initial filter stages that are identical.

10. The carrier aggregation circuit of claim 1 wherein the first time division duplex filter and the second time division duplex filter are implemented as a bulk acoustic wave (BAW) filter or a surface acoustic wave (SAW) filter.

11. The carrier aggregation circuit of claim 1 wherein the secondary path is configured to include a third time division duplex filter configured to process receive signals in the second frequency band and a fourth filter configured to process transmit signals in the second frequency band, the third time division duplex filter and the fourth time division duplex filter including one or more corresponding initial filter stages that are identical, and the third time division duplex filter and the fourth time division duplex filter being implemented as a bulk acoustic wave (BAW) filter or a surface acoustic wave (SAW) filter.

12. The carrier aggregation circuit of claim 1 wherein the first frequency band is between approximately 2,300 MHz to 2,400 MHz, or between approximately 2,496 MHz to 2,690 MHz.

13. The carrier aggregation circuit of claim 1 wherein the second frequency band is between approximately 1,920 MHz to 1,980 MHz and approximately 2,110 MHz to 2,170 MHz, or between approximately 1,710 MHz to 1,785 MHz and approximately 1,805 MHz to 1,880 MHz, or between approximately 2,500 MHz to 2,570 MHz and approximately 2,620 MHz to 2,690 MHz, or between approximately 1,850 MHz to 1,915 MHz and approximately 1,930 MHz to 1,995 MHz, or between approximately 1,880 MHz to 1,920 MHz, or between approximately 1,710 MHz to 1,780 MHz and approximately 2,110 MHz to 2,200 MHz.

14. The carrier aggregation circuit of claim 1 wherein the first frequency band is between approximately 2,300 MHz to 2,400 MHz, and the second frequency band is either between approximately 1,920 MHz to 1,980 MHz and approximately 2,110 MHz to 2,170 MHz, or between approximately 1,710 MHz to 1,785 MHz and approximately 1,805 MHz to 1,880 MHZ, or between approximately 2,500 MHz to 2,570 MHz and approximately 2,620 MHz to 2,690 MHz.

15. The carrier aggregation circuit of claim 1 wherein the first frequency band is between approximately 2,496 MHz to 2,690 MHz, and the second frequency band is between approximately 1,920 MHz to 1,980 MHz and approximately 2,110 MHz to 2,170 MHz, or between approximately 1,710 MHz to 1,785 MHz and approximately 1,805 MHz to 1,880 MHz, or between approximately 1,850 MHz to 1,915 MHz and approximately 1,930 MHz to 1,995 MHZ, or between approximately 1,880 MHz to 1,920 MHz, or between approximately 1,710 MHz to 1,780 MHz and approximately 2,110 MHz to 2,200 MHz.

16. The carrier aggregation circuit of claim 1 wherein the primary signal path includes a power amplifier (PA) configured to amplify signals for transmitting and a low noise amplifier (LNA) configured to amplify received signals.

17. A front-end module configured to support carrier aggregation, the front-end module comprising:
a primary signal path for processing a first frequency band, the first frequency band being a first time division duplex (TDD) frequency band;
a secondary signal path for processing a second frequency band;
the primary signal path including a first time division duplex filter module configured to process receive signals in the first frequency band and a second time division duplex filter module configured to process transmit signals in the first frequency band;
the first time division duplex filter module and the second time division duplex filter module including one or more filters that have one or more corresponding initial filter stages that are identical, the one or more corresponding initial filter stages comprising a single resonator, a pair of parallel and series resonators, or a plurality of parallel and series resonators;
an antenna switch module coupled to an antenna port and to at least the primary signal path and the secondary signal path;
a low noise amplifier (LNA) module including one or more low noise amplifiers configured to amplify signals received at the antenna port via the first time division duplex filter module; and
a power amplifier (PA) module including one or more power amplifiers configured to amplify signals received at a transceiver port for providing to the second time division duplex filter module.

18. The front-end module of claim 17 further comprising a multiplexer coupled to the power amplifier module and the low noise amplifier module, the multiplexer being configured to direct amplified signals along a plurality of paths.

19. The front-end module of claim 17 further comprising a frequency division duplex (FDD) filter module configured to process receive signals in the second frequency band and transmit signals in the second frequency band.

* * * * *